(12) United States Patent
Bozio

(10) Patent No.: US 10,428,864 B2
(45) Date of Patent: Oct. 1, 2019

(54) CONSOLE FOR VEHICLE INTERIOR

(71) Applicant: Shanghai Yanfeng Jinqiao Automotive Trim Systems Co. Ltd, Novi, MI (US)

(72) Inventor: Ronald A Bozio, Holland, MI (US)

(73) Assignee: Shanghai Yanfeng Jinqiao Automotive Trim Systems Co. Ltd., Novi, MI (US)

(*) Notice: Subject to any disclaimer, the term of this patent is extended or adjusted under 35 U.S.C. 154(b) by 153 days.

(21) Appl. No.: 15/680,453

(22) Filed: Aug. 18, 2017

(65) Prior Publication Data

US 2017/0341544 A1   Nov. 30, 2017

Related U.S. Application Data

(63) Continuation of application No. PCT/US2016/028007, filed on Apr. 16, 2016.
(Continued)

(51) Int. Cl.
*F16C 13/00* (2006.01)
*B60R 7/04* (2006.01)
*B60N 2/75* (2018.01)

(52) U.S. Cl.
CPC ............ *F16C 13/006* (2013.01); *B60N 2/773* (2018.02); *B60N 2/793* (2018.02); *B60R 7/04* (2013.01); *F16C 2326/20* (2013.01)

(58) Field of Classification Search
CPC . B60N 3/10; B60N 2/468; B60N 2/79; B60N 3/103; B60N 3/104
(Continued)

(56) References Cited

U.S. PATENT DOCUMENTS 4,995,680 A * 2/1991 Miruri ................ B60R 11/0205
248/27.1
5,050,922 A   9/1991 Falcoff
(Continued)

FOREIGN PATENT DOCUMENTS

CN       102079272 A     6/2011
DE   102007013080 A1     9/2008
(Continued)

OTHER PUBLICATIONS

Extended European Search Report from the European Patent Office for EP Patent Application No. 16780963.1 dated Mar. 7, 2018 (in English) (9 pages).
(Continued)

*Primary Examiner* — D Glenn Dayoan
*Assistant Examiner* — Sunsurraye Westbrook

(57) ABSTRACT

A component for vehicle interior is disclosed. The component may comprise a base, an armrest configured to move relative to the base from a retracted position to an extended position, a roller coupled to the armrest configured to allow movement of the armrest relative to the base and a rail coupled to the base. The rail may be configured to allow movement of the armrest relative to the base along a non-linear path. The rail may comprise a curved rail, a curved guide, or a curved track. The non-linear path may be aligned with a contour of the base. The non-linear path may reduce a gap between the armrest and the base or provide improved comfort. The roller may comprise a first rolling bearing, a second roller bearing and a third roller bearing. The component may comprise a door configured to selectively cover and uncover a storage compartment.

18 Claims, 7 Drawing Sheets

Related U.S. Application Data

(60) Provisional application No. 62/149,368, filed on Apr. 17, 2015.

(58) Field of Classification Search
USPC ...... 296/24.34, 37.8, 70, 1.08, 37.14, 37.12, 296/37.1, 64; 297/188.04, 188.14, 284.1, 297/411.2; 29/428, 453, 430, 434, 464
See application file for complete search history.

(56) References Cited

U.S. PATENT DOCUMENTS

| | | | |
|---|---|---|---|
| 5,845,965 A | 12/1998 | Heath et al. | |
| 5,847,685 A * | 12/1998 | Otsuki | B60K 35/00 345/87 |
| 6,039,141 A * | 3/2000 | Denny | B60N 2/797 180/329 |
| 6,419,314 B1 | 7/2002 | Scheerhorn | |
| 7,014,255 B2 * | 3/2006 | Amamiya | B60N 2/143 296/190.08 |
| 8,888,147 B2 * | 11/2014 | Blanck | B60R 7/04 292/34 |
| 2002/0066392 A1 * | 6/2002 | Calam | B60R 11/0252 108/33 |
| 2006/0131910 A1 | 6/2006 | Cowelchuk et al. | |
| 2007/0003397 A1 | 1/2007 | Hirschman et al. | |
| 2007/0152461 A1 | 7/2007 | Joler et al. | |
| 2009/0212586 A1 | 8/2009 | Blanck et al. | |
| 2011/0121596 A1 | 5/2011 | Beyer | |

FOREIGN PATENT DOCUMENTS

| | | |
|---|---|---|
| EP | 1588892 A2 | 10/2005 |
| WO | 2014012021 A1 | 1/2014 |
| WO | 2014028874 A1 | 2/2014 |
| WO | 2015034788 A1 | 3/2015 |

OTHER PUBLICATIONS

Written Opinion for International Application No. PCT/US16/28007 dated Jul. 21, 2016.

International Search Report for International Application No. PCT/US16/28007 dated Jul. 21, 2016.

European Search Opinion from the European Patent Office for EP Patent Application No. 16780963.1 dated Mar. 7, 2018 (in English) (5 pages).

First Office Action from the China National Intellectual Property Administration for CN Patent Application No. 201680025881.X dated Jan. 29, 2019 (with English translation) (21 pages).

\* cited by examiner

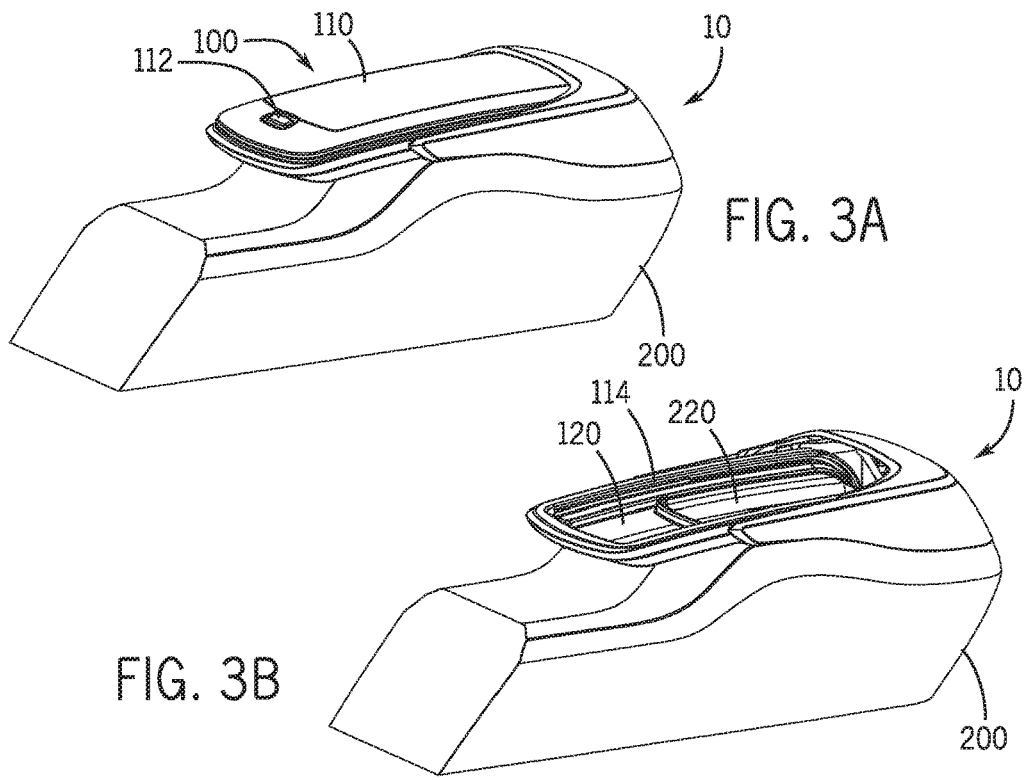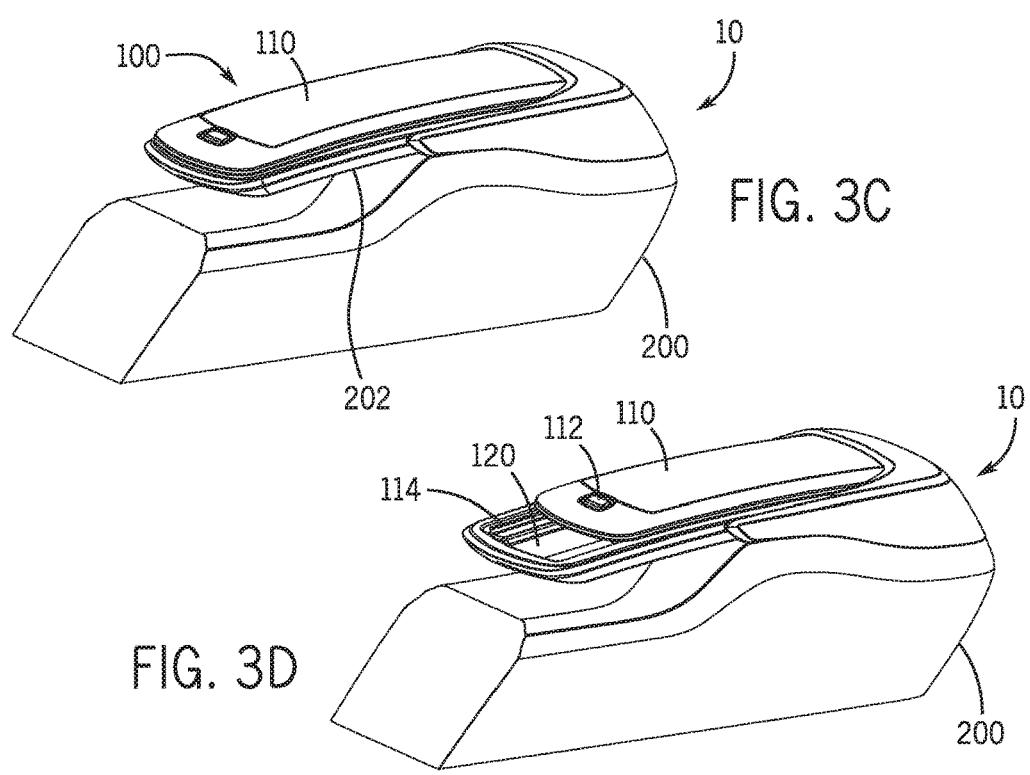

CONSOLE FOR VEHICLE INTERIOR

CROSS REFERENCE TO RELATED APPLICATION

The present application is a continuation of PCT/US16/028007 titled "CONSOLE FOR VEHICLE INTERIOR" filed Apr. 16, 2016.

The present application claims priority from and the benefit of and incorporates by reference in entirety the following application: U.S. Provisional Patent Application Ser. No. 62/149,368 entitled "NON-LINEAR TRAVEL SYSTEM FOR AN ADJUSTABLE ARMREST" filed Apr. 17, 2015.

FIELD

The present invention relates to a console for a vehicle interior. The present invention also relates to a console for a vehicle interior providing an adjustable armrest. The present invention further relates to an adjustable armrest for use within the vehicle interior.

BACKGROUND

It is known to provide an armrest in locations throughout the interior of a vehicle (e.g. for use/comfort by passengers). It is also known to provide a console (e.g. floor console) between the driver seat and the passenger seat which may include an armrest; the armrest may be adjustable to facilitate driver/passenger comfort. It is further known to provide a console that may present a curved contour.

It would be advantageous to provide an improved console for a vehicle interior that provides an adjustable armrest able to adjust generally in accommodation of a curved contour of the console (e.g. with a styled theme) intended to enhance passenger/driver comfort.

SUMMARY

The present invention relates to a component for a vehicle interior. The component may comprise a base, an armrest configured to move relative to the base from a retracted position to an extended position, at least one roller coupled to the armrest configured to allow movement of the armrest relative to the base and a rail coupled to the base. The rail may be configured to allow movement of the armrest relative to the base along a non-linear path. The rail may comprise at least one of a curved rail, a curved guide and a curved track. The at least one roller may comprise a first roller bearing, a second roller bearing and a third roller bearing. The first roller bearing and the second roller bearing may be configured to contact a top side of the rail and the third roller bearing may be configured to contact a bottom side of the rail. The first roller bearing and the second roller bearing may be configured to prevent substantially downward movement of the armrest relative to the base, and the third roller bearing may be configured to prevent substantially upward movement of the armrest relative to the base. The third roller bearing may be configured to force the first roller bearing and the second roller bearing to contact the rail. A spring may be configured to force the third roller bearing to contact the rail and prevent upward movement of the armrest relative to the base. The rail may extend along a wall of the storage compartment. The non-linear path may be aligned with a contour of the base. The base may comprise a detent configured to prevent movement of the armrest from at least one of (a) the extended position to the retracted position and (b) the retracted position to the extended position. The armrest may comprise at least one notch. The detent may be configured to engage the at least one notch to prevent movement of the armrest from at least one of (a) the extended position to the retracted position and (b) the retracted position to the extended position. The door may be configured to selectively cover and uncover the storage volume when the armrest is in the retracted position and when the armrest is in the extended position. The non-linear path may be configured to at least (a) reduce a gap between the armrest and the base and (b) provide improved comfort.

The present invention also relates to a vehicle armrest system. The armrest system may comprise a support structure comprising a storage compartment and a rail; an armrest supported by the support structure and configured for adjustment from a first state with the armrest in a retracted position comprising a first length to a second state with the armrest in an extended position comprising a second length different than the first length; a door configured to slide relative to the armrest between an open position and a closed position in both the retracted position and the extended position of the armrest. The armrest may comprise at least one roller configured to enable movement of the armrest and the door relative to the support structure. The door may be configured to cover the storage compartment in the first state and the second state and slide relative to the armrest to uncover the storage compartment in the first state and in the second state. The at least one roller may comprise a first roller bearing, a second roller bearing and a third roller bearing. The first roller bearing, the second roller bearing and the third roller bearing may be configured to roll against the rail to enable the armrest to adjust from the first state to the second state. The support structure may comprise a curved top surface adjacent a curved bottom surface of the armrest. The armrest may adjust from the first state to the second state along a non-linear path aligned with the curved top surface of the support structure.

FIGURES

FIGS. 3A through 3D are schematic perspective views of a floor console with an armrest assembly according to an exemplary embodiment.

DESCRIPTION

Figure 1A:
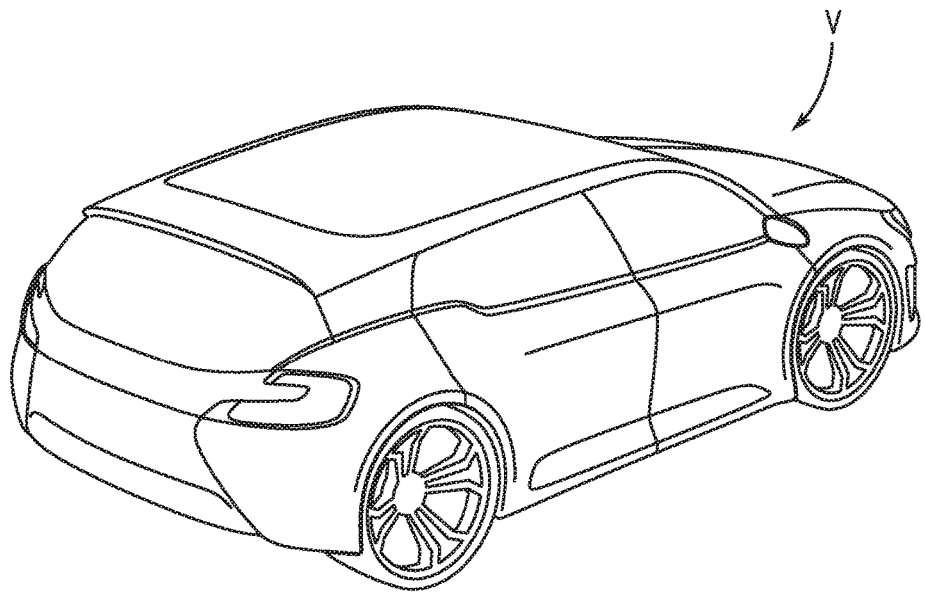
FIG. 1A is a schematic perspective view of a vehicle according to an exemplary embodiment.
Figure 1B:
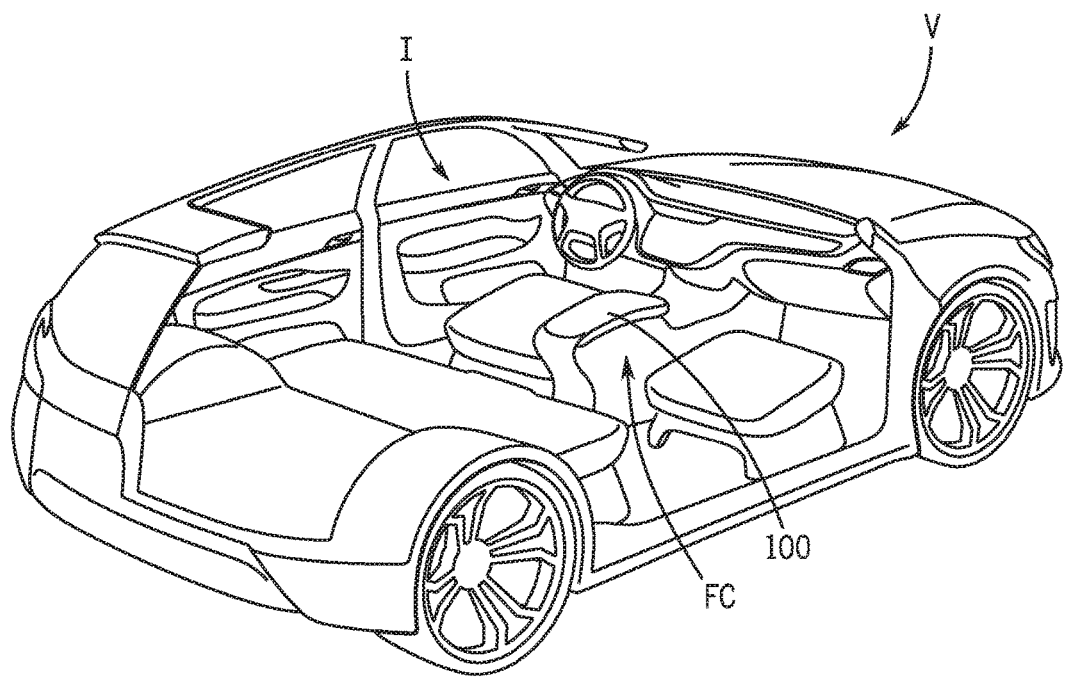
FIG. 1B is a schematic perspective cut-away view of a vehicle according to an exemplary embodiment.

Referring to FIGS. 1A and 1B, a vehicle V is shown including an interior I with a floor console FC. Floor console FC comprises a cover shown as an armrest 100 configured to move/adjust between a retracted position and an extended position. Floor console FC may provide a storage compartment beneath the cover/armrest 100; the cover/armrest 100 may provide a tambour door to facilitate access of the storage compartment.

Figure 2A:
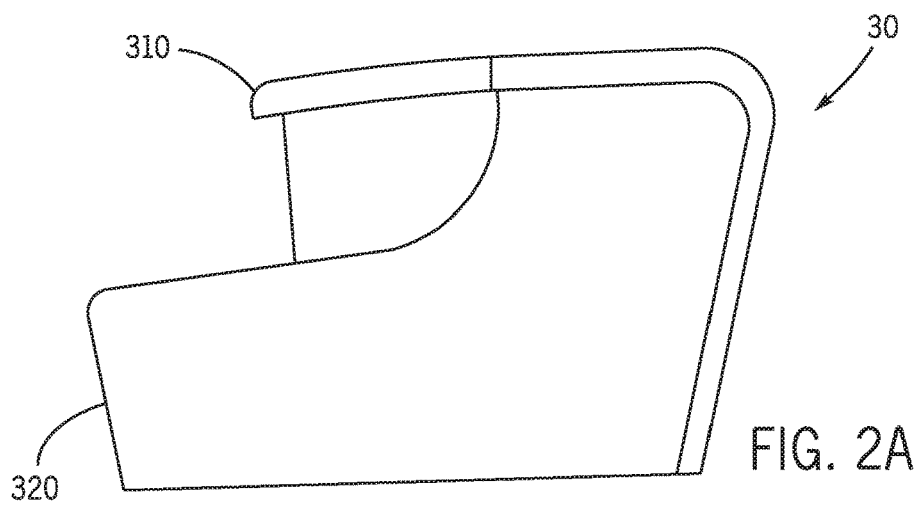
FIGS. 2A through 2C are schematic side views of a floor console with an armrest assembly according to an exemplary embodiment.
Figure 2B:
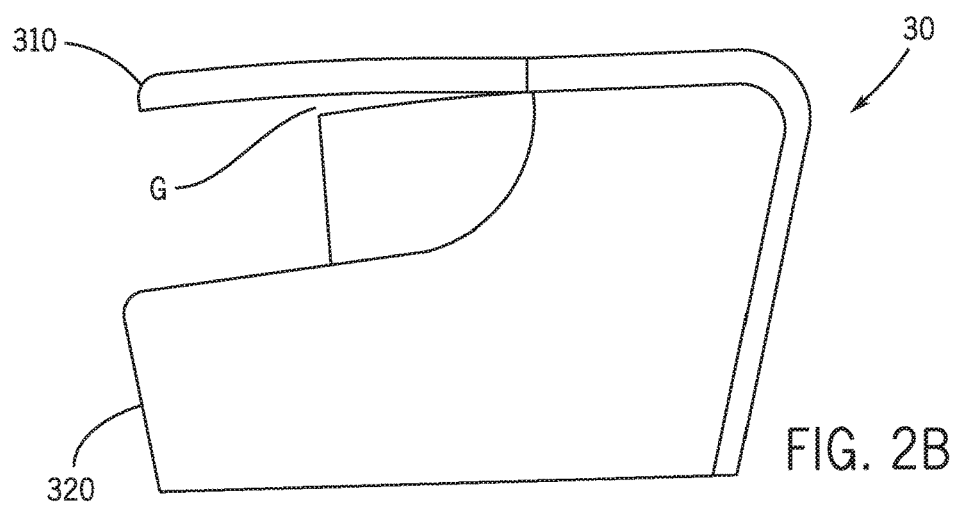
Figure 2C:
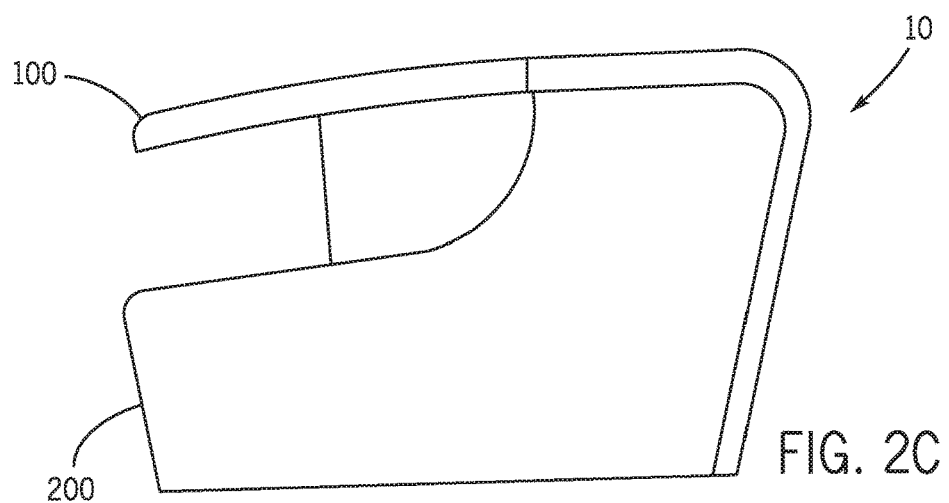

As shown schematically in FIGS. 2A to 2C, the base of the floor console may comprise a curved top (e.g. profile or surface). As shown schematically in FIGS. 2A and 2B, a floor console 30 may comprise a base 320 with a cover shown as an armrest 310. As shown schematically in FIG. 2A, armrest 310 is in the retracted position; as shown schematically in FIG. 2B, armrest 310 is in the extended position. According to an exemplary embodiment, armrest 310 travels in a generally horizontal path relative to the base 320 or console 30; as armrest 310 moves or adjusts from the retracted position to the extended position, a gap G is established between the top surface of base 320 and the bottom surface of armrest 310. See FIGS. 2A and 2B. As shown schematically in FIG. 2C, a floor console 10 may provide a curved path for the adjustment/movement of armrest 100; the curved path for the adjustable armrest 100 may follow the curved contour of the profile of base 200. As shown schematically in FIG. 2C, the curved path of travel substantially eliminates the gap between the top surface of the base 200 and the bottom surface of the armrest 100 as the armrest adjusts from the retracted position to the extended position.

As shown schematically in FIGS. 3A to 3D, according to an exemplary embodiment, a floor console 10 may provide a base 200 and an armrest 100 with a tambour door 110. As shown schematically in FIGS. 3A and 3B, armrest 100 is in the retracted position. As shown schematically in FIG. 3A, tambour door 110 is in the closed position; as shown schematically in FIG. 3B, tambour door 110 is in the open position; armrest assembly 100 may provide a latch controlled by a button 112 on the tambour door to facilitate opening and closing of tambour door 110. As shown schematically in FIG. 3B, armrest 100 may provide a track 114 configured to support the tambour door and facilitate movement of the tambour door. According to an exemplary embodiment, tambour door 110 may provide a padded surface intended to improve comfort for the vehicle occupants (e.g. using the armrest). As shown schematically in FIG. 3B, a storage compartment 220 may be provided within the base 200 of floor console 10; a tray 120 may be provided within the armrest 100 to provide storage space for smaller items. Storage compartment 220 and tray 120 may be configured to store/hold items (e.g. for vehicle occupants).

As shown schematically in FIGS. 3C and 3D, the armrest 100 is in the extended position. As shown schematically in FIG. 3C, tambour door 110 is in the closed position; as shown schematically in FIG. 3D, tambour door 110 is partially open; tray 120 is exposed to store/hold items or remove items within tray 120. As shown schematically in FIGS. 3C and 3D, the top profile of base 200 has a curved contour 202; armrest 100 travels on a curved path which follows the contour 202 of base 200 and/or reduces (e.g. substantially eliminates) the gap between base 200 and armrest 100. Compare FIG. 2B.

Figure 4A:
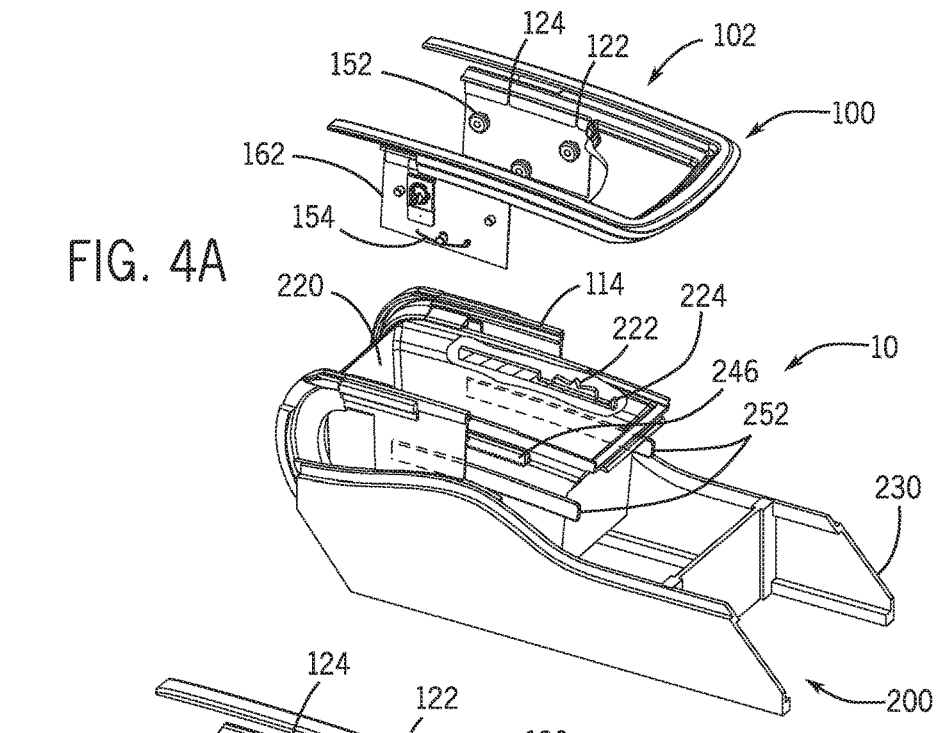
FIG. 4A is a schematic perspective exploded view of a floor console according to an exemplary embodiment.

As shown schematically in FIG. 4A, floor console 10 may comprise a base 200 and an adjustable armrest 100. Armrest 100 may comprise a mechanism 102 configured to facilitate movement (e.g. sliding) of the armrest 100 relative to the base 200. Base 200 may provide a structure 230 to support a storage bin 220 and armrest assembly 100.

Figure 4B:
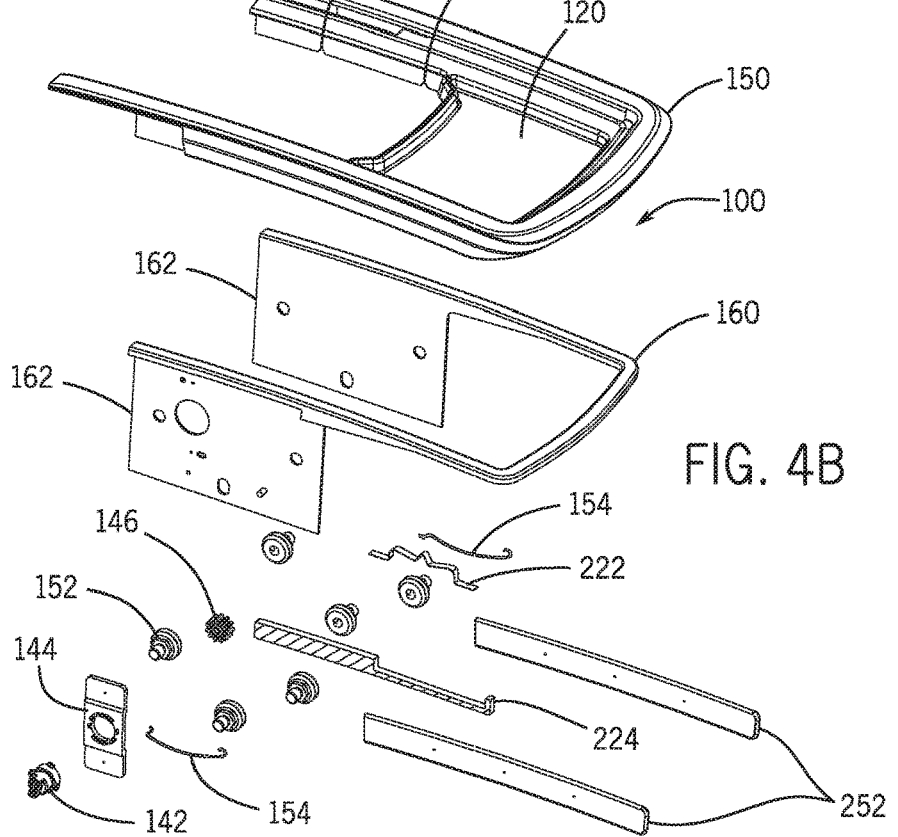
FIG. 4B is a schematic perspective exploded view of an armrest assembly according to an exemplary embodiment.

As shown schematically in FIG. 4B, armrest 100 may comprise a bracket 150, a tray 120 with notches 122 and notches 124 on opposing sides of tray 120. According to an exemplary embodiment, armrest 100 may also comprise a bracket 160 with mounting plates 162 on opposing sides of bracket 160; each mounting plate 162 may be provided with three roller bearings 152; roller bearings 152 may be fixed to the armrest 100. According to an exemplary embodiment, base 200 may provide curved rails 252 on opposing sides of base 200 configured to engage with roller bearings 152 on each corresponding side. Two roller bearings 152 are above curved rail 252; one roller bearing 152 is below curved rail 252 as shown schematically in FIGS. 5A and 5B. Springs 154 may be provided on each mounting plate 162 to reduce/eliminate slack between roller bearings 152 and curved rail 252. According to an exemplary embodiment, any arrangement of roller bearings (e.g. greater or less in number) could be used to engage with the curved rail; any number of roller bearings could engage with the curved rail from above or from below the curved rail.

As shown schematically in FIGS. 4A and 4B according to an exemplary embodiment, base 200 may comprise a detent spring 222 and a mounting carrier 224 for mounting the detent spring 222 onto base 200. Detent spring 222 may comprise a detent configured to engage notch 122 to hold the armrest assembly at the retracted position or to engage notch 122 to hold the armrest assembly at the extended position. See also FIGS. 5A and 5B.

As shown schematically in FIGS. 4A and 4B according to an exemplary embodiment, floor console 10 may provide a rack and pinion mechanism; a rack 246 may be fixed to the storage bin 220; a gear shown as a pinion 146 may be attached to the mounting plate 162. According to an exemplary embodiment, a damper shown as a rotary damper 142 may be attached to mounting plate 162 by a damper carrier 144; damper 142 and pinion 146 may share the same center of rotation; damper 142 may provide resistance when armrest assembly moves between the retracted position and the extended position.

Figure 5A:
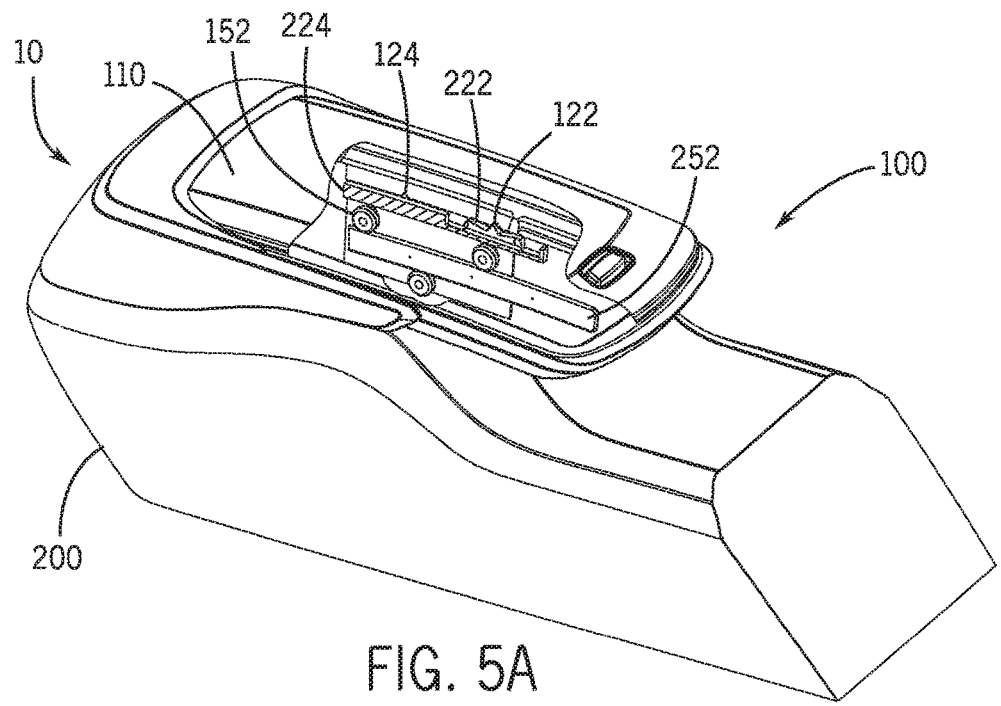
FIGS. 5A through 5B are schematic perspective cut-away views of a floor console according to an exemplary embodiment.
Figure 6A:
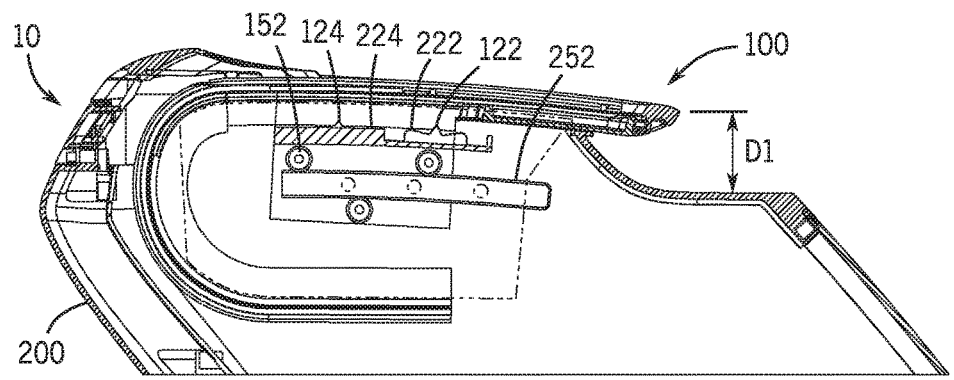
FIG. 6A is a schematic cross-section view of a floor console according to an exemplary embodiment.
Figure 6B:
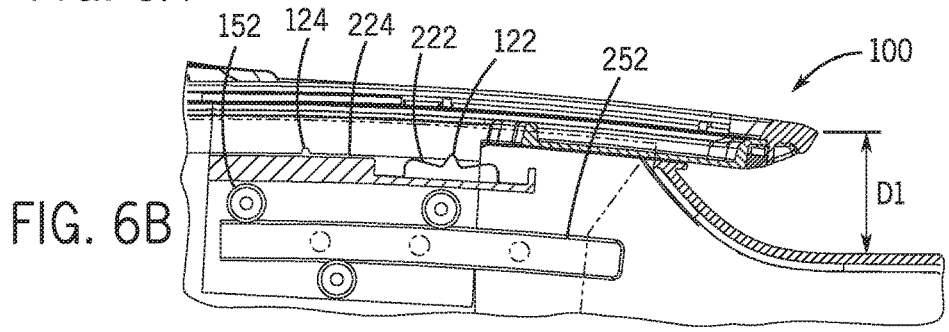
FIG. 6B is a schematic cross-section detail view of a floor console according to an exemplary embodiment.

As shown schematically in FIGS. 5A, 6A and 6B, armrest 100 is at the retracted position; detent spring 222 is engaged with notch 122; each roller bearing 152 may provide a groove along the circumference of the bearing configured to engage with curved rail 252 and slide along curved rail 252 to reduce friction.

Figure 5B:
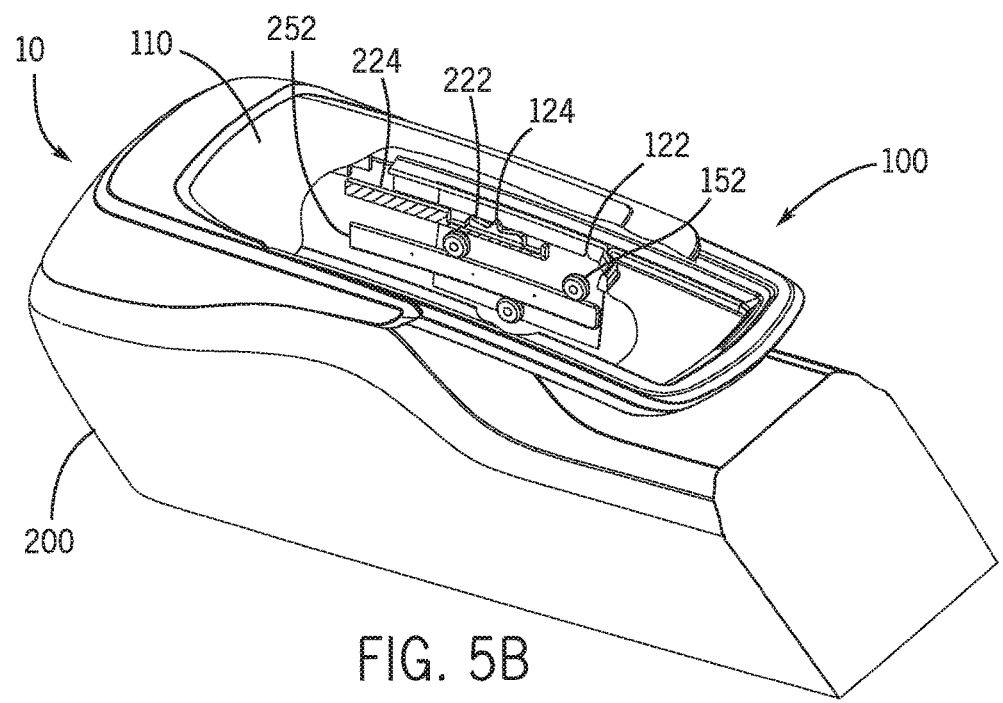
Figure 6C:
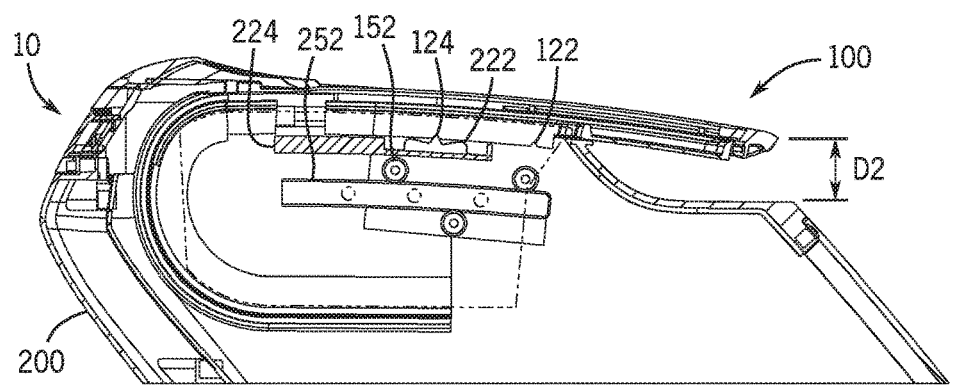
FIG. 6C is a schematic cross-section view of a floor console according to an exemplary embodiment.
Figure 6D:
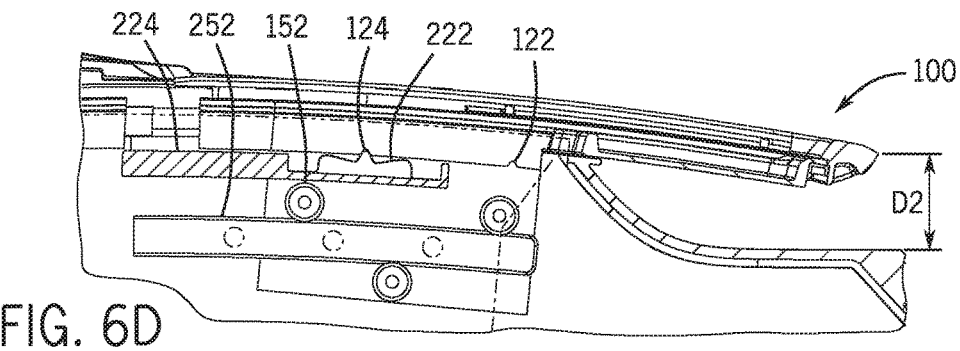
FIG. 6D is a schematic cross-section detail view of a floor console according to an exemplary embodiment.

As shown schematically in FIGS. 5B, 6C and 6D, armrest 100 is at the extended position; tambour door 110 is partially open; detent spring 222 is engaged with notch 124; each roller bearing 152 may provide a groove along the circumference of the bearing to allow bearing 152 to engage with curved rail 252 and slide along curved rail 252 to reduce friction.

Figure 7:
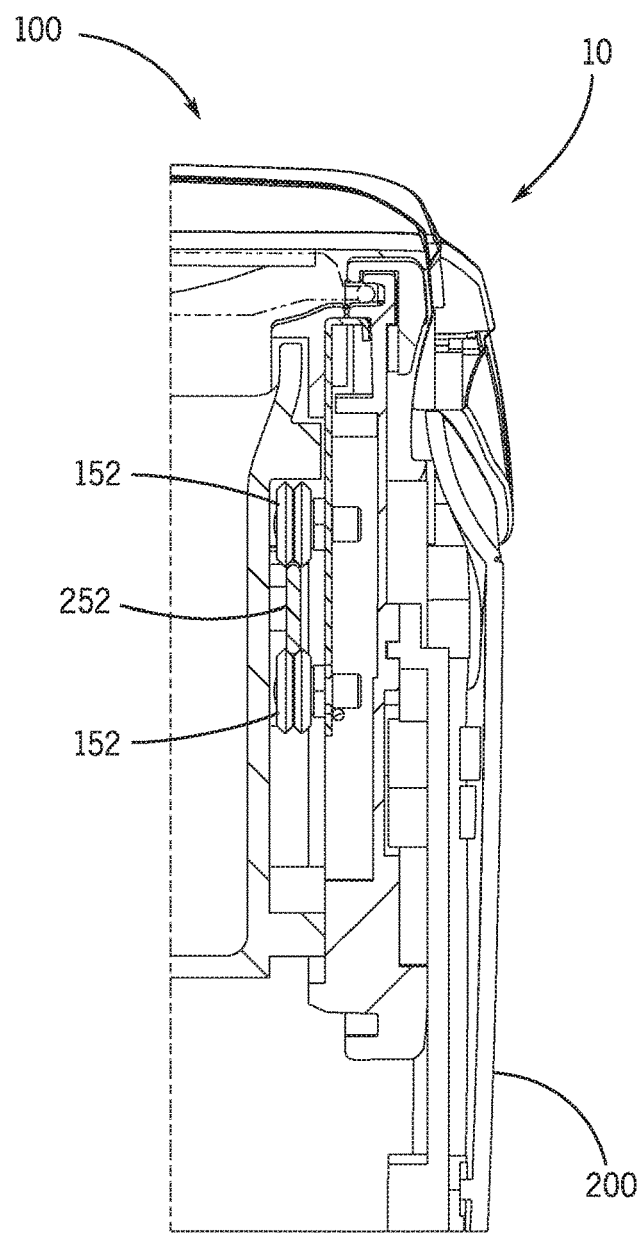
FIG. 7 is a schematic cross-section partial front view of a floor console according to an exemplary embodiment.

As shown schematically in FIG. 7, floor console 10 comprises base 200 and armrest 100. According to an exemplary embodiment, curved rail 252 may be fixed to base 200; curved rail 252 may provide constant radius edge surface to engage with roller bearings 152. According to an exemplary embodiment, roller bearings 152 may be attached to armrest 100 and move together with armrest 100; each roller bearing 152 may provide a groove along the circumference of the roller bearing 152 to engage with the constant radius edge surface of curved rail 252. See FIGS. 5A, 5B and 7.

Exemplary Embodiment

The present disclosure relates to a non-linear travel system for an adjustable armrest that enables the armrest to travel in a curved path. The armrest may move parallel to the contoured surface of the console intending to substantially reduce or eliminate gap between the console and the armrest. The curved path of travel of the non-linear travel system may substantially eliminate flat section on the armrest surface in the area of the tambour door.

As shown schematically in FIG. 1, a vehicle V includes an interior I having a console FC. Console FC may include an armrest 100; console may include a non-linear travel system; armrest 100 may include a curved contour and travel along a curved path when extended and retracted using the non-linear travel system. According to an exemplary embodiment, the non-linear travel system may be used by other armrests located in the interior of the vehicle (e.g. on the doors, the console of a back seat, the chairs, etc.); non-linear travel system may be used for other components in the vehicle such as storage compartments (e.g. glove box, sunglass holder). One or more roller bearings may be attached to the armrest and interact with a curved guide rail attached to the base of the console FC. A spring-loaded idler roller bearing may be used to stabilize the armrest 100; a detent assembly may be used to lock the armrest 100 in a retracted position or an extended position; a damper may control the speed of movement of the armrest. The non-linear travel system may substantially reduce or eliminate a gap between the surface of the console FC and the armrest 100 as the armrest moves toward the extended position.

As shown schematically in FIG. 2C, the console 10 includes a support structure shown as a base 200; base 200 may include a storage compartment 220 configured to retain various items (e.g. documents, glasses, and/or portable electronic devices, etc.). See FIGS. 3B and 4A. The console 10 may provide a retractable tambour door 110 and be configured to cover an opening. The tambour door 110 may be supported by a track and may move between one or more positions. See FIGS. 3A through 3D.

The console 10 also includes an adjustable armrest 100 that has a curved contour; adjustable armrest 100 includes a non-linear travel system; the non-linear travel system enables the armrest to travel along a curved path between the retracted position and the extended position. A person may access the storage compartment by opening the tambour door 110; the adjustable armrest 100 with the curved contour may maintain contact with or be positioned proximate to a surface 202 of the base 200 as the armrest 100 moves between the extended position and retracted position (reducing or eliminating a gap between the base 200 and the armrest 100). See FIGS. 3A through 3D.

As shown schematically in FIG. 4A and FIGS. 5A through 5B, the non-linear travel system 102 includes two roller bearings 152 configured to engage the top of the curved guide rail 252; a third roller bearing 152 functions as an idler engaged with the bottom of the curved guide rail 252 (more or fewer roller bearings 152 may be used to engage the top of the curved guide rail 252 and/or the bottom of the curved guide rail 252). According to an exemplary embodiment, top roller bearing 152 may engage the top of the curved guide rail 152 and two roller bearings 152 may engage the bottom of the curved guide rail 252.

According to an exemplary embodiment, the two top roller bearings 152 are located at a first height level and the third roller bearing 152 is located at a second height level (lower than the first height level). The two top roller bearings 152 are spaced apart so that one roller bearing 152 is located near the front of the bracket 160 and one roller bearing 152 is located near the back of the bracket 160; idler roller bearing 152 is positioned on the mounting plate 162 of bracket 160 approximately in the middle of the two top roller bearings 152. This configuration may provide stability to the armrest 100. The idler third roller bearing 152 may be spring loaded to block upward movement of the armrest 100 and keep the top roller bearings 152 engaged on the curved guide rail 252; idler third roller bearing 152 may maintain a generally constant spring load on all of the roller bearings 152.

As shown schematically in FIGS. 4A and 4B, according to an exemplary embodiment, the roller bearings 152 are coupled to the mounting plate 162 of bracket 160; curved guide rails 252 may be rounded at the ends to facilitate installation of roller bearings 152 onto the curved guide rails 252 during assembly.

According to an exemplary embodiment, a detent assembly 222 is coupled to one of the side wall of the storage compartment 220; detent assembly 222 includes a spring (e.g. metal). See FIGS. 4A and 4B. According to an exemplary embodiment, tray 120 includes a first notch 122 and a second notch 124 cut into a bottom surface; first notch 122 is located near the front of the tray 120 and second notch 124 is located near the back of tray 120. According to an exemplary embodiment, the detent assembly 222 is configured to engage with the first notch 122 and second notch 124 to control movement of the armrest 100 (e.g. to establish two detent positions); first notch 122 corresponds to the retracted position and the second notch 124 corresponds to the extended position. See FIGS. 5A and 5B. A damper 142 may be employed to control the speed of movement of the armrest 100 as the armrest 100 transitions between the retracted position and extended position. See FIGS. 4A and 4B.

As shown in FIG. 5B, the adjustable armrest 100 is shown in the extended position. System 102 provides for travel of armrest 100 along the curved contour so that the armrest 100 stays parallel to the curved surface 202 of the base 200. See FIG. 5B. In the extended position, the adjustable armrest 100 is held in place by the detent spring 222 engaging the second notches 124; curved track 114 for the tambour door 110 enables the tambour door to cover storage compartment 220. See FIG. 5B. The curved track 114 (See FIG. 4A) substantially matches the contour of the curved guide rails 252; tambour door 110 follows the curved path when the armrest 100 is extended; curved track 114 for the tambour door 110 expands between the retracted position (see FIG. 5A) and the expanded position (see FIG. 5B).

According to an exemplary embodiment, the detent assembly may include a metal spring 222; detent assembly may be located within a recess of and attached to the mounting carrier 224; detent assembly engages notch 124 and notch 122 on the tray 120 to control the movement of the adjustable armrest 100. See FIGS. 5A and 5B. According to an exemplary embodiment, a second set of notches may be provided at the opposing side of notch 122 and notch 124; according to an exemplary embodiment, a second detent assembly may be provided on the opposing side of the first detent assembly to engage with the second set of notches.

It is important to note that the construction and arrangement of the elements of the inventive concepts and inventions as described in this application and as shown in the figures is illustrative only. Although some embodiments of the present inventions have been described in detail in this disclosure, those skilled in the art who review this disclosure will readily appreciate that many modifications are possible without materially departing from the novel teachings and advantages of the subject matter recited. All such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions may comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A component for a vehicle interior comprising:
   (a) a base;
   (b) an armrest configured to move relative to the base from a retracted position to an extended position;
   (c) at least one roller coupled to the armrest configured to allow movement of the armrest relative to the base; and
   (d) a rail coupled to the base;
   wherein the rail is configured to allow movement of the armrest relative to the base along a non-linear path;
   wherein the rail comprises at least one of (a) a curved rail, (b) a curved guide, (c) a curved track;
   wherein the at least one roller comprises a first roller bearing, a second roller bearing and a third roller bearing;
   wherein the component further comprises a spring configured to force the third roller bearing to contact the rail and prevent upward movement of the armrest relative to the base.

2. The component of claim 1 wherein the first roller bearing and the second roller bearing are configured to contact a top side of the rail and the third roller bearing is configured to contact a bottom side of the rail.

3. The component of claim 1 wherein the first roller bearing and the second roller bearing are configured to prevent substantially downward movement of the armrest relative to the base and the third roller bearing is configured to prevent substantially upward movement of the armrest relative to the base.

4. The component of claim 1 wherein the third roller bearing is configured to force the first roller bearing and second roller bearing to contact the rail.

5. The component of claim 1 wherein the base comprises a detent configured to prevent movement of the armrest from at least one of (a) the extended position to the retracted position, (b) the retracted position to the extended position.

6. The component of claim 5 wherein the armrest comprises at least one notch and wherein the detent is configured to engage the at least one notch to prevent movement of the armrest from at least one of (a) the extended position to the retracted position, (b) the retracted position to the extended position.

7. The component of claim 1 further comprising a door and a storage compartment, wherein the door is configured to selectively cover and uncover the storage compartment when the armrest is in the retracted position and when the armrest is in the extended position.

8. The component of claim 1 wherein the non-linear path is configured to at least (a) reduce a gap between the armrest and the base, (b) provide improved comfort.

9. A component for a vehicle interior comprising:
   (a) a base;
   (b) an armrest configured to move relative to the base from a retracted position to an extended position;
   (c) at least one roller coupled to the armrest configured to allow movement of the armrest relative to the base; and
   (d) a rail for the armrest coupled to the base;
   wherein the armrest comprises a track and a door configured to move along the track between an open position and a closed position;
   wherein the rail comprises a non-linear surface configured to allow movement of the armrest with the door relative to the base along a non-linear path;
   wherein the armrest comprises a bracket configured to move along the non-linear surface of the rail;
   wherein the non-linear path is aligned with a contour of the base.

10. The component of claim 9 wherein the at least one roller comprises a first roller bearing, a second roller bearing and a third roller bearing.

11. The component of claim 10 wherein the first roller bearing and the second roller bearing are configured to prevent substantially downward movement of the armrest relative to the base and the third roller bearing is configured to prevent substantially upward movement of the armrest relative to the base.

12. The component of claim 9 wherein the base comprises a detent configured to prevent movement of the armrest from at least one of (a) the extended position to the retracted position, (b) the retracted position to the extended position.

13. The component of claim 9 further comprising a door and a storage compartment, wherein the door is configured to selectively cover and uncover the storage compartment when the armrest is in the retracted position and when the armrest is in the extended position.

14. The component of claim 9 wherein the rail comprises at least one of (a) a curved rail, (b) a curved guide, (c) a curved track, (d) a non-linear rail.

15. A vehicle armrest system comprising:
   (a) a support structure comprising a storage compartment and a rail;
   (b) an armrest supported by the support structure and configured for adjustment from (1) a first state with the armrest in a retracted position comprising a first length to (2) a second state with the armrest in an extended position comprising a second length different than the first length; and
   (c) a door configured to slide relative to the armrest between an open position and a closed position in both the retracted position and the extended position of the armrest;
   wherein the armrest comprises at least one roller configured to enable movement of the armrest and the door relative to the support structure;
   wherein the support structure comprises a curved top surface adjacent a curved bottom surface of the armrest;
   wherein the armrest is configured to adjust from the first state to the second state along a non-linear path aligned with the curved top surface of the support structure;
   wherein the support structure comprises a detent spring mounted to a carrier of the support structure;

wherein the armrest comprises a first notch and a second notch;

wherein the detent spring is configured to (a) engage the first notch to prevent movement of the armrest from the extended position to the retracted position, (b) engage the second notch to prevent movement of the armrest from the retracted position to the extended position.

16. The vehicle armrest system of claim 15 wherein the door is configured to cover the storage compartment in the first state and the second state and slide relative to the armrest to uncover the storage compartment in the first state and in the second state.

17. The vehicle armrest system of claim 15 wherein the at least one roller comprises a first roller bearing, a second roller bearing and a third roller bearing.

18. The vehicle armrest system of claim 17 wherein the first roller bearing, the second roller bearing and the third roller bearing are configured to roll against the rail to enable the armrest to adjust from the first state to the second state.

* * * * *